United States Patent
Grywacheski et al.

(10) Patent No.: US 6,773,343 B2
(45) Date of Patent: Aug. 10, 2004

(54) FRONT CHAFFER AND CLEANING FAN

(75) Inventors: Sheldon Joseph Grywacheski, Eldridge, IA (US); Kenneth Ralph Clifton, Coal Valley, IL (US); Jeffrey Ray Payne, Cordova, IL (US); Jeffrey Allan Schlautman, Lapeer, MI (US); Glenn Pope, Viola, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/209,400

(22) Filed: Jul. 31, 2002

(65) Prior Publication Data

US 2004/0023704 A1 Feb. 5, 2004

(51) Int. Cl.[7] .............................................. A01F 12/44
(52) U.S. Cl. ........................................ 460/99; 460/100
(58) Field of Search ........................... 460/99, 100, 97, 460/101, 112, 119, 903, 66

(56) References Cited

U.S. PATENT DOCUMENTS

| | | | | |
|---|---|---|---|---|
| 875,550 A | * | 12/1907 | McCorkell | 460/85 |
| 3,109,433 A | * | 11/1963 | Claas | 460/90 |
| 3,638,659 A | * | 2/1972 | Dahlquist et al. | 460/1 |
| 3,800,804 A | * | 4/1974 | Boone | 460/99 |
| 3,913,589 A | | 10/1975 | Rouse et al. | 130/24 |
| 4,303,079 A | * | 12/1981 | Claas et al. | 460/99 |
| 4,314,571 A | | 2/1982 | DeBusscher et al. | 130/27.2 |
| 4,353,376 A | * | 10/1982 | Schuler | 460/67 |
| 4,770,190 A | * | 9/1988 | Barnett | 460/102 |
| 4,863,415 A | * | 9/1989 | Carnewal et al. | 460/101 |
| 5,387,154 A | | 2/1995 | Peters | 460/99 |
| 5,466,190 A | | 11/1995 | Skinner et al. | 460/101 |
| 5,525,108 A | * | 6/1996 | Rouse et al. | 460/101 |
| 5,558,576 A | * | 9/1996 | Meyers | 460/99 |
| 5,624,315 A | | 4/1997 | Jonckheere | 460/99 |
| 5,885,155 A | * | 3/1999 | Dwyer et al. | 460/72 |
| 6,036,597 A | * | 3/2000 | Arner | 460/6 |
| 6,458,031 B1 | * | 10/2002 | Matousek et al. | 460/99 |

* cited by examiner

Primary Examiner—Árpád Fab Kovács

(57) ABSTRACT

A cleaning shoe of an agricultural combine is provided with a front chaffer located upstream from the main chaffer. The front chaffer has a closed upstream portion and an open downstream portion. The closed upstream portion is upwardly inclined and the open downstream portion is downwardly inclined. The front chaffer is oriented so that an air blast from the cleaning fan passes beneath the closed upstream portion and upwardly through the declined open downstream portion. The open downstream portion is provided with transversely extending louvers through which the air blast passes. The cleaning fan comprises a plurality of radially and transversely extending fan blades. Blade inserts forming air dams are located near each transverse end. The blade inserts are provided with apertures that limited the transverse air flow along the blades.

28 Claims, 3 Drawing Sheets

FRONT CHAFFER AND CLEANING FAN

FIELD OF THE INVENTION

The present invention is directed to a front chaffer having an inclined closed upstream portion and a declined open downstream portion. A cleaning fan is provided with blade inserts having apertures that limit the transverse slow of air along the cleaning fan blades.

BACKGROUND OF THE INVENTION

Agricultural combines harvest an agricultural crop, thresh the harvested crop to break the large crop components from the smaller crop components, separate the smaller crop components from the larger crop components, and clean the smaller components to eliminate chaff from the grain. The combine may be equipped with various harvesting assemblies including grain platforms (rigid and flexible), corn headers, row crop headers or windrow pickup platforms depending on the crop and the harvesting practices employed by the farmer. Similarly, the threshing assembly of the combine may be configured in a number of different ways, including a conventional transverse threshing cylinder and concave, or a rotary threshing system that is either axially of transversely arranged. In addition, the separating assembly may comprise conventional straw walkers or rotary assemblies.

The cleaning system removes chaff from the grain. The cleaning system typically comprises a cleaning shoe and a cleaning fan. The smaller crop components from the threshing assembly and the separating assembly are directed to the cleaning shoe. The cleaning shoe typically is provided with a chaffer and a sieve. The chaffer and sieve have transverse louvers that define openings. The heavier clean grain falls through the openings formed by the louvers on the chaffer and the sieve. The air blast from the cleaning fan blows the chaff out the rear of the combine.

There are three types of cleaning shoe actions, they are: reciprocating, shaker and cascading. In a reciprocating shoe the chaffer and sieve move in opposite directions to one another. In a shaker shoe the chaffer and sieve move in the same direction at the same time. In a cascading shoe the chaffers and sieve are positioned so that the small components drop from one unit to another in a cascading or rolling motion.

SUMMARY OF THE INVENTION

It is an object of the present invention to provide a high capacity cleaning assembly for an agricultural combine.

A cleaning shoe of an agricultural combine is provided with a front chaffer located upstream from the main chaffer. The front chaffer has a closed upstream portion and an open downstream portion. The closed upstream portion is upwardly inclined and the open downstream portion is downwardly inclined. The front chaffer is oriented so that an air blast from the cleaning fan passes beneath the closed upstream portion and upwardly through the declined open downstream portion. The open downstream portion is provided with transversely extending louvers through which the air blast passes. Grain and heavier particles fall through the louvers to a crash pan that directs these components to a main chaffer.

The cleaning fan is housed in a housing having two air blast openings. The first opening directs a first air blast beneath the front chaffer, the second air blast opening directs a second air blast beneath the crash pan. The cleaning fan comprises a plurality of radially and transversely extending fan blades. The blade inserts forming air dams are located near each transverse end. The blade inserts are provided with apertures that limit the transverse air flow along the blades.

DETAILED DESCRIPTION

Figure 1:
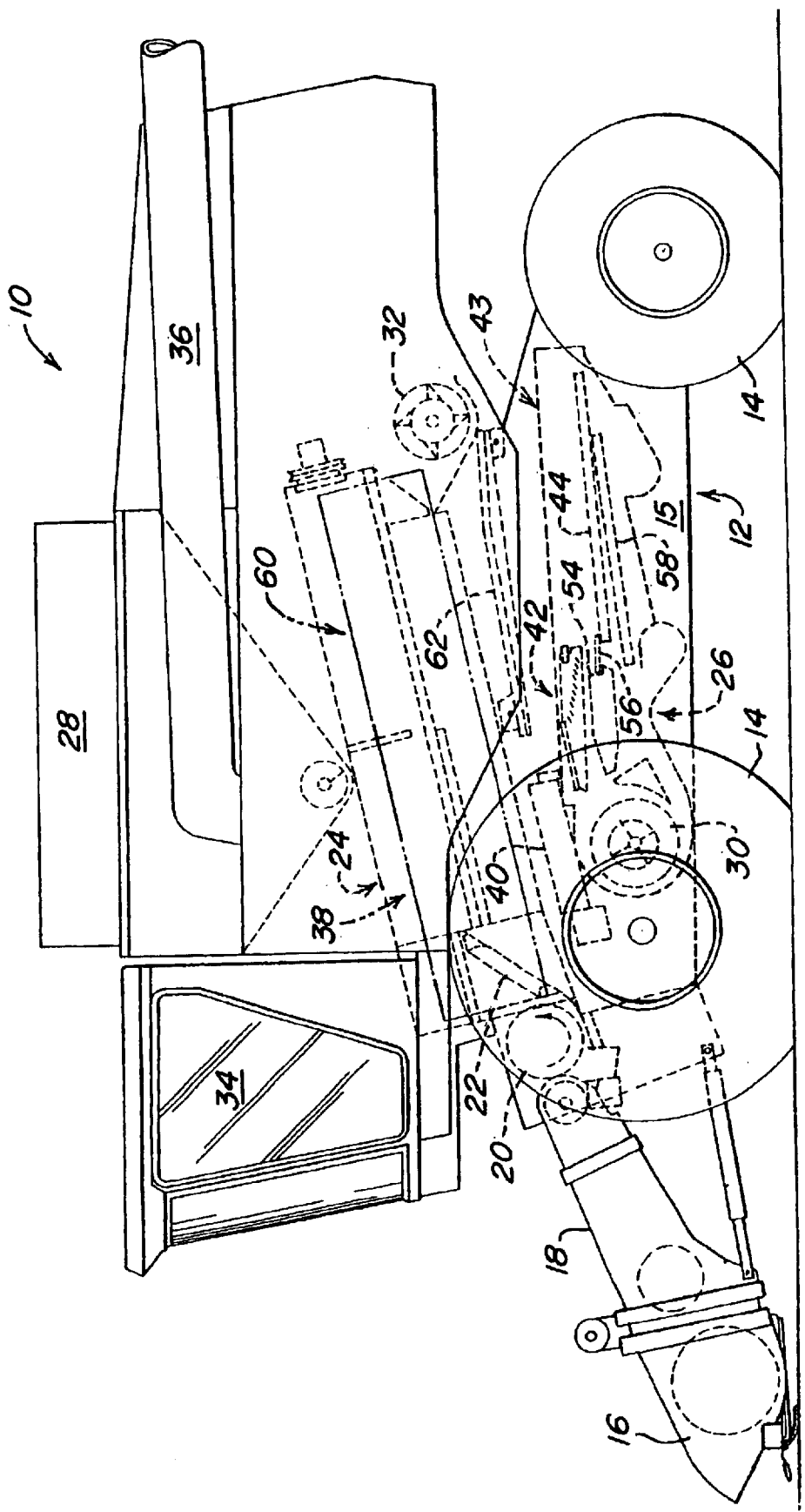
FIG. 1 is a side view of an agricultural combine including the present invention.
Figure 2:
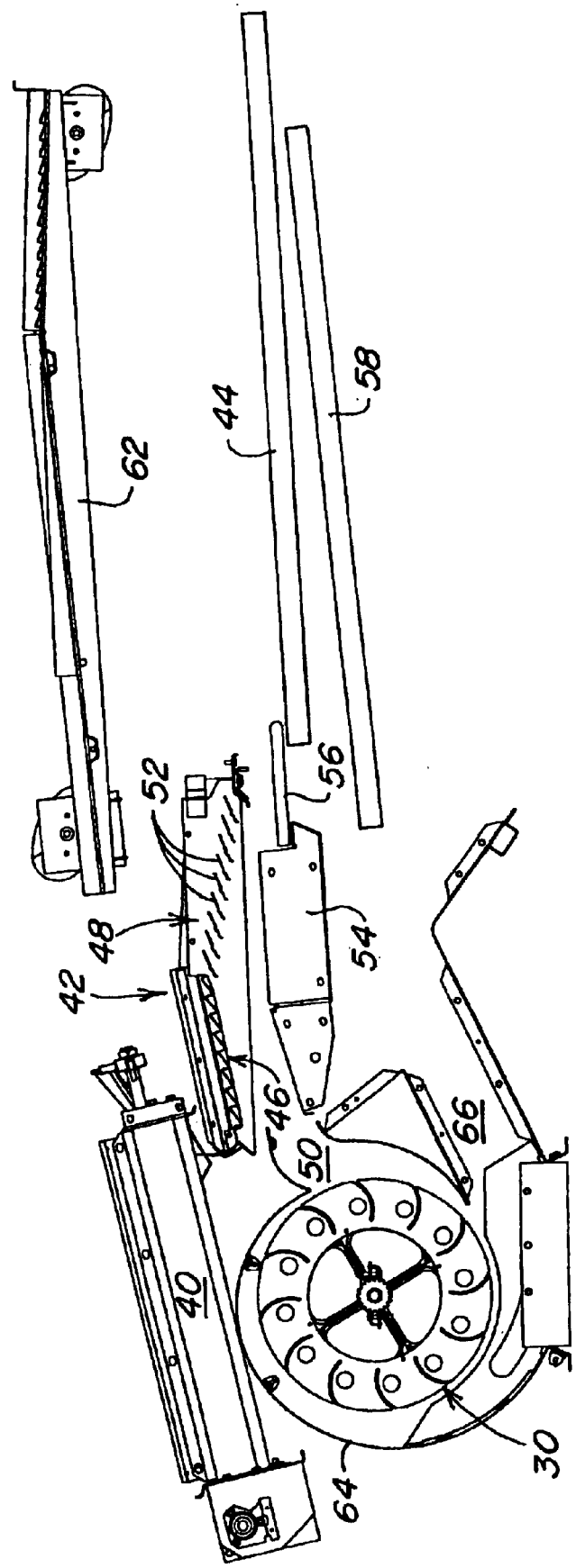
FIG. 2 is a side view of a portion of the cleaning assembly for an agricultural combine.
Figure 3:
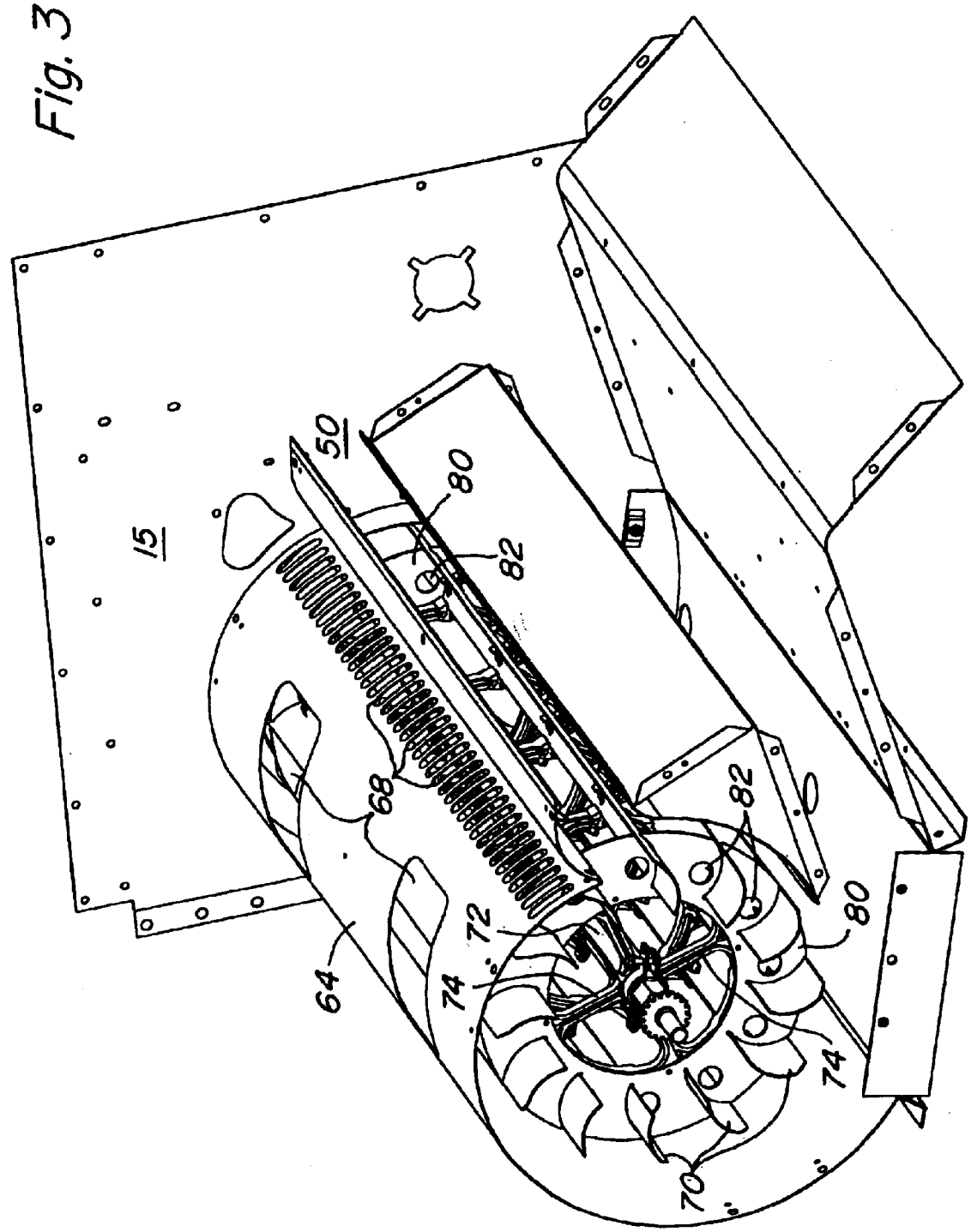
FIG. 3 is a cutaway perspective view of the cleaning fan and housing of the present invention.

FIG. 1 is the side view of a self-propelled agricultural combine 10. The combine comprises a frame 12 that is provided with wheels 14 for supporting and propelling the combine 10. The frame 12 comprises two axially extending sidesheets 15 between which are located the various crop processing assemblies. Extending forwardly from the combine 10 is a harvesting platform 16 which directs a harvested crop to feederhouse 18. The feederhouse 18 is a conveyor for directing the harvested crop material to the threshing, separating and cleaning assemblies located within the sidesheets 15 of the combine 10. Although the present invention is disclosed as being mounted on a axially arranged rotary combine it may also be used on conventional and other combine configurations having a cleaning assembly.

In the illustrated combine, the feederhouse 18 directs the harvested crop to a transverse beater 20 which propels the crop material through an inlet transition section 22 to an axial threshing and separating assembly 24. Grain and chaff are directed from the axial threshing and separating assembly 24 to cleaning assembly 26. The cleaning assembly 26 in turn directs the clean grain to a grain tank 28 and the chaff is blown out the rear of the combine by a cleaning fan 30. Crop material other than grain and chaff is directed by the axial separating unit to a transverse beater 32 which propels this material out the rear of the combine. Clean grain temporarily stored in grain tank 28 can be unloaded by an operator in operator's cab 34 actuating unloading auger 36.

Although not as clear cut as on a conventional combine, the illustrated axially arranged rotary combine 10 is provided with a threshing assembly 38 which produces a high grain/low chaff mixture. This grain rich mixture is directed to axial augers 40. These augers direct this grain rich mixture to a front chaffer 42 which is mounted to the cleaning shoe 43 and moves with the main chaffer 44. The grain rich mixture from augers 40 falls onto the closed upstream portion 46 of the front chaffer 42. The closed upstream portion 46 is inclined upwardly. The top surface of the closed upstream portion 46 is provided with steps for propelling the grain rich mixture upwardly and rearwardly as the front chaffer 42 is reciprocated by the cleaning shoe 43. The reciprocating movement drives the grain rich mixture to the open downstream portion 48 of the front chaffer 42. An air blast form the cleaning fan 30 is directed by the first air blast opening 50 to the bottom surface of the closed upstream portion 46 of the front chaffer 42. The open upstream portion 48 is provided with a plurality of transversely extending louvers 52 that define openings through which the heavier grain can fall. The air blast from opening 50 follows the bottom surface of the closed upstream portion until it encounters the lower surface of the open downstream portion. The downward inclination of the open downstream portion 48 and the louvers 52 direct some of the air blast upwardly through the open downstream portion to blow the chaff rearwardly and to let the grain pass through the louvers 52.

The grain falling from the downstream open portion 48 of the front chaffer 42 is caught in a crash pan 54. The crash pan 54 is also reciprocated with the cleaning shoe and is provided with steps that drive the grain and chaff received by the crash pan 54 upwardly and rearwardly to fingerbars 56. The grain either falls through the fingerbars 56 to the sieve 58 or the grain and chaff is directed across the fingerbars to the main chaffer 44. The main chaffer and sieve further cleaning the grain by releasing chaff from the grain so it can be blown out the rear of the combine 10 by the air blasts generated by the cleaning fan 30.

The grain/high chaff mixture from the separating section 60 is directed to the front chaffer 42 by pan 62. Because of the air blast flowing through the open downstream portion 48 of the front chaffer 42 some of this grain/high chaff mixture does not reach the front chaffer 42 and is blown rearwardly directly to the main chaffer 44.

The cleaning fan 30 is located in a housing 64 defining a first air blast opening 50 for directing a first air blast below the front chaffer 42 and a second air blast opening 66 for directing a second air blast under the crash pan 54 to the main chaffer 44. Approximately eighty percent of the air volume of the cleaning fan 30 flows through the second air blast opening 66 whereas the remaining twenty percent of the air volume flows through the first air blast opening 50. The housing 64 comprises a circumferential wall that extends between the sidesheets 15. The sidesheets 15 have openings through which air can be fed into the transverse ends of the cleaning fan 30. In addition, the circumferential wall is provided with apertures 68 located upstream from the first air blast opening 50 for feeding air radially to the cleaning fan 30.

The cleaning fan 30 comprises a plurality of transversely and radially extending blades 70 that are mounted to a central axle 72 by a series of radially extending members 74. The cleaning fan defines a cylinder having first and second transverse ends that are located adjacent to the sidesheets 15 of the combine 10. Typically, the greatest air flow for a cleaning fan 30 is at the transverse center of the cleaning fan 30 with reduced air flow at the transverse ends. As the cleaning fan 30 pumps air a portion of the air stream moves transversely across the fan blades 70. To reduce this flow, first and second blade inserts 80 are mounted near the transverse ends of the cleaning fan 30 to retain air at these ends that is drawn in through the openings in the sidesheets 15. In this way the blade inserts 80 produce a transversely more uniform air blast across the cleaning fan 30. The blade inserts 80 form an air dam having apertures 82 that limit the transverse flow of air along the fan blades 70. The blades inserts are flat rings. The number of apertures 82 correspond to the number of fan blades 70 so that some air flows transversely across all of the blades 70.

Having described the preferred embodiment, it will become apparent that various modifications can be made without departing from the scope of the invention as defined in the accompanying claims.

What is claimed is:

1. An agricultural combine comprising:
   a frame;
   ground engaging means for propelling the frame through a field;
   a threshing assembly for threshing a harvested agricultural crop;
   a cleaning shoe having a main chaffer and a front chaffer located upstream from the main chaffer for receiving threshed out components of the agricultural crop from the threshing assembly, the front chaffer is provided with a closed inclined pan portion and a declined chaffer portion, the closed inclined pan has a top surface and a bottom surface, the declined chaffer portion is provided with a series of transversely extending louvers that define openings, the declined chaffer portion having an upper surface and a lower surface.

2. An agricultural combine as defined by claim 1 wherein a crash pan is located below the front chaffer and upstream of the main chaffer.

3. An agricultural combine as defined by claim 2 further comprising a cleaning fan located upstream from the cleaning shoe, the cleaning fan directs an air blast between the crash pan and the front chaffer.

4. An agricultural combine as defined by claim 3 wherein the cleaning fan directs the air blast along the bottom surface of the closed inclined pan portion of the front chaffer.

5. An agricultural combine as defined by claim 4 wherein the air blast of the cleaning fan passes along the bottom surface of the closed inclined portion to the lower surface of the declined chaffer portion where a portion of the air blast is intercepted by the declined chaffer portion and passes through the openings defined by the louvers.

6. An agricultural combine as defined by claim 5 wherein the top surface of the closed inclined pan portion receives the threshed out components of the agricultural crop from the threshing assembly.

7. An agricultural combine as defined by claim 6 further comprising a separating assembly located downstream from the threshing assembly for receiving threshed agricultural crop material from the threshing assembly, the separating assembly releases threshed out portions of the agricultural crop from the threshed agricultural material and directs these threshed out portions to the upper surface of the declined chaffer portion of the front chaffer.

8. An agricultural combine as defined by claim 7 wherein the cleaning fan also generates a second air blast that passes beneath the crash pan and through the main chaffer.

9. An agricultural combine as defined by claim 8 wherein the second air blast is greater than the air blast.

10. An agricultural combine as defined by claim 1 further comprising a cleaning fan located upstream from the cleaning shoe, the cleaning fan directs an air blast to the cleaning shoe.

11. An agricultural combine as defined by claim 10 wherein the cleaning fan directs the air blast along the bottom surface of the closed inclined pan portion of the front chaffer.

12. An agricultural combine as defined by claim 11 wherein the air blast of the cleaning fan passes along the bottom surface of the closed inclined portion to the lower surface of the declined chaffer portion where a portion of the air blast is intercepted by the declined chaffer portion and passes through the openings defined by the louvers.

13. An agricultural combine as defined by claim 12 wherein the top surface of the closed inclined pan portion receives the threshed out components of the agricultural crop from the threshing assembly.

14. An agricultural combine as defined by claim 13 further comprising a separating assembly located downstream from the threshing assembly for receiving threshed agricultural crop material from the threshing assembly, the separating assembly releases threshed out portions of the agricultural crop from the threshed agricultural material and directs these threshed out portions to the upper surface of the declined chaffer portion of the front chaffer.

15. An agricultural combine as defined by claim 14 wherein a crash pan is located below the front chaffer and upstream of the main chaffer, the cleaning fan also generates a second air blast that passes beneath the crash pan and through the main chaffer.

16. An agricultural combine as defined by claim 15 wherein the second air blast is greater than the air blast.

17. A cleaning assembly for an agricultural combine, the cleaning system comprising:
- a cleaning shoe having a main chaffer and a front chaffer located upstream form the main chaffer for receiving threshed out components of an agricultural crop, the front chaffer is provided with a closed inclined pan portion and a declined chaffer portion, the closed inclined pan has a top surface and a bottom surface, the declined chaffer portion is provided with a series of transversely extending louvers that define openings, the declined chaffer portion having an upper surface and a lower surface;
- a cleaning fan directing an air blast to the cleaning shoe for separating the threshed out components.

18. A cleaning assembly as defined by claim 17 wherein a crash pan is located downstream from the front chaffer and upstream of the main chaffer.

19. A cleaning assembly as defined by claim 18 wherein the cleaning fan directs the air blast between the crash pan and the front chaffer.

20. A cleaning assembly as defined by claim 19 wherein the cleaning fan directs the air blast along the bottom surface of the closed inclined pan portion of the front chaffer.

21. A cleaning assembly as defined by claim 20 wherein the air blast of the cleaning fan passes along the bottom surface of the closed inclined portion to the lower surface of the declined chaffer portion where a portion of the air blast is intercepted by the declined chaffer portion and passes through the openings defined by the louvers.

22. A cleaning assembly as defined by claim 21 wherein the fan also generates a second air blast that passes beneath the crash pan and through the main chaffer.

23. A cleaning assembly as defined by claim 22 wherein the second air blast is greater than the air blast.

24. A cleaning assembly for an agricultural combine, the cleaning assembly comprising:
- a main chaffer for receiving chaff and grain;
- a fan for directing an air blast at the chaffer;
- a front chaffer located between the chaffer and the fan, the front chaffer having an upwardly inclined upstream portion and a downwardly inclined downstream portion, the air blast passing beneath the upstream portion and upwardly through the downstream portion.

25. A cleaning assembly as defined by claim 24 wherein the upstream portion is closed and the downstream portion is open with transversely extending louvers.

26. A cleaning assembly as defined by claim 25 wherein a crash pan is located beneath the downstream portion of the front chaffer for receiving grain and chaff falling from the downstream portion and directing grain and chaff received by the downstream portion to the main chaffer.

27. A cleaning assembly as defined by claim 26 wherein the air blast passes beneath the upstream portion and through the downstream portion of the front chaffer and above the main chaffer, the fan also generates a second air blast that passes beneath the crash pan and through the main chaffer.

28. A cleaning assembly as defined by claim 27 wherein the second air blast is greater than the air blast.

* * * * *